United States Patent [19]
Konves

[11] Patent Number: 4,941,367
[45] Date of Patent: Jul. 17, 1990

[54] ROTARY TO LINEAR MOTION CONVERTER

[76] Inventor: Richard L. Konves, 1500 E. Warren #33, Santa Ana, Calif. 92705

[21] Appl. No.: 276,244

[22] Filed: Nov. 25, 1988

[51] Int. Cl.⁵ .................. F16H 25/12; F16H 23/08
[52] U.S. Cl. ............................................. 74/53; 74/60
[58] Field of Search .......................... 74/53, 60, 107

[56] References Cited

U.S. PATENT DOCUMENTS

| | | | |
|---|---|---|---|
| 2,431,126 | 11/1947 | Knapp | 74/53 X |
| 4,103,556 | 8/1978 | Niday | 74/60 X |
| 4,195,905 | 4/1980 | Hansen | 74/53 X |

FOREIGN PATENT DOCUMENTS 244836  10/1969  U.S.S.R. .................... 74/60

Primary Examiner—Allan D. Herrmann
Attorney, Agent, or Firm—Klein & Szekers

[57] ABSTRACT

A rotary-to-linear motion converter comprising a frame having a roll axis, and a pitch axis passing through a common point. The axes are mutually orthogonal. The common point is positioned between an input end and an output end. An input shaft rotates on the roll axis and has an offset drive cam on its interior end. The offset drive cam has a central point positioned at the frame common point. A rocker housing has a pitch axis and a yaw axis. The pitch axis and yaw axis are mutually orthogonal and pass through a common reference point. Pitch bearings mount the rocker housing pitch axis for rotation on the frame pitch axis and position the rocker housing common reference point to be coincident with the frame common point. A rocker cam means rotates the rocker housing yaw axis and couples rotary motion from the offset drive cam into oscillatory rocker housing pitch motion. An output shaft is slidably coupled to the frame. A pivot arm translates the oscillatory pitch motion of the rocker housing into reciprocating linear motion for the output shaft.

18 Claims, 2 Drawing Sheets

ROTARY TO LINEAR MOTION CONVERTER

BACKGROUND

This invention relates to the field of reciprocating mechanisms, and in particular, the present invention is directed to transferring the rotary motion from the surface of an offset drive cam into oscillating linear motion using a minimum number of parts.

PRIOR ART

Rotary-to-linear motion converters are found in a variety of applications such as power tools, engines, sewing machines and compressors. In power tools, for example, many complex machined parts are often employed simply to move an output shaft back and forth. As the complexity of a rotary-to-linear motion converter increases, wear and fracture points become a problem due to harmonic-induced stress, and vibration-induced chatter. Such vibration results in increased noise, providing another limitation to the use of prior art devices.

U.S. Pat. No. 4,221,545, issued to K. Terauchi et al is of interest since it shows a wobble plate driven by a cam rotor. This prior art device uses a bearing ball having a complex arrangement of pins to support and locate the wobble plate in relation to the cam rotor. In addition, the wobble plate assembly used in this device requires a complex arrangement of ball socket elements, which are typically quite difficult to machine.

SUMMARY OF THE INVENTION

It is an object of this invention to provide an apparatus for converting rotary-to-linear motion with as few as six moving parts. It is a more particular object of the invention to avoid the use of complex machined surfaces, such as spherical surfaces, gears, eccentric discs, or eccentric channels of any kind, thereby assuring reproduceability and low cost.

The objectives of the invention are realized in a rotary to linear motion converter having a frame with a rotary input shaft provided at one end of the frame, and an output shaft provided at the other end of the frame. The shafts are coaxially aligned on the frame input axis. The input shaft is free to rotate but is not free to translate longitudinally. The output shaft is free to reciprocate.

A rocker housing is mounted to rotate on the frame pitch axis. A rocker cam rotates on the rocker housing yaw axis. The pitch and yaw rotational axes are orthogonal and intersect at the intersection of the frame pitch axis and the frame roll axis. The rocker cam has a flat surface that contains the point of intercept of the pitch and yaw axes. The rocker cam flat surface is positioned flush against the surface of the flat surface of an offset drive cam formed on the interior end of the input shaft.

The offset drive cam flat surface is formed by cutting or milling the interior end of the input shaft to form a flat surface at a slight bias angle with respect to a plane normal to the shaft axis. As the surface of the offset drive cam rotates, motion from the flat surface of the offset drive cam is transferred via the flat surface of the rocker cam into a combination of yaw motion on the rocker cam yaw axis and rocker housing pitch motion on the frame pitch axis. The pitch motion transferred to the rocker housing is oscillatory and completes one cycle per revolution of the input shaft.

A pivot arm has a forward end pivotally coupled to the interior end of the output shaft. The rocker housing is pivotally coupled to the rear end of the pivot arm at a rocker housing pivot. The rocker housing pivot is located at a crank arm radius from the pitch axis and is parallel to the pitch axis. As the rocker housing oscillates through a small angle on the pitch axis of the frame, the rocker housing pivot oscillates on an arc of rotation at the crank arm radius The oscillatory motion of the rocker housing pivot is translated, via the pivot arm, into reciprocating linear motion of the output shaft.

DETAILED DESCRIPTION OF A PREFERRED EMBODIMENT

Figure 1:
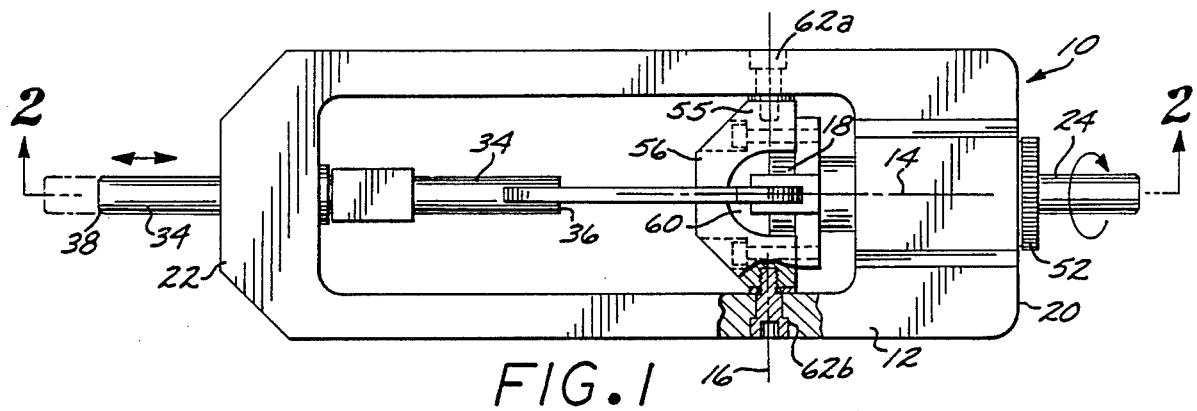
FIG. 1 is a top plan view of a rotary-to-linear motion converter in accordance with a preferred embodiment of the present invention, showing the rocker cam in a central position.

FIG. 1 shows a top view of a rotary-to-linear motion converter 10 in accordance with a preferred embodiment of the present invention. The rotary-to-linear motion converter has a frame 12 having a roll axis 14 and a pitch axis 16 passing through a frame common point 18. The frame roll and pitch axes are orthogonal. The frame common point 18 is positioned to be between a frame input end 20 and a frame output end 22.

Figure 2:
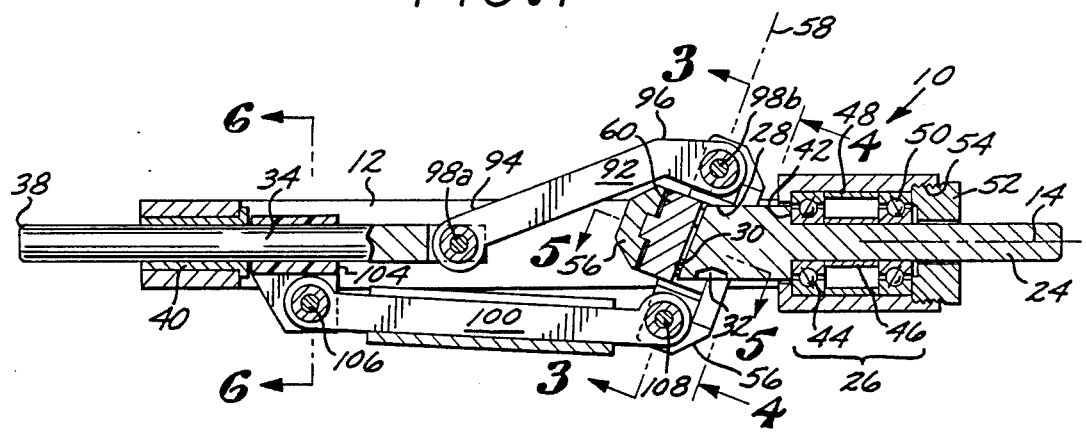
FIG. 2 is a side sectional view taken along line line 2—2 of FIG. 1, showing the input shaft at the 180 degree position, the rocker cam in a central position, and the output shaft retracted.

FIG. 2 shows an input shaft 24 in side sectional view. The input shaft 24 is shown to be coaxial with the roll axis 14 as it extends to the right through a bearing assembly 26, and it is adapted for connection to a source of rotary motion, such as an electric motor (not shown) referenced to the frame 12. The input shaft 24 is free to rotate with respect to the frame 12 on the roll axis 14.

The input shaft 24 has an interior end 28 terminating in a flat surface 30 that a forms an angle of less than 45 degrees with respect to a plane normal or orthogonal to the roll axis 14, the flat surface having a central point on the roll axis at the frame common point 18. The flat surface 30 provides an offset drive cam. Recess 32 is a shallow drill hole in the input shaft 24 positioned to compensate for the imbalance produced by flat surface 30 being cut at an acute angle leaving less material on one side of the shaft 26 than on the other. The recess 32 balances the shaft for smooth operation at high speed.

The output shaft 34 is shown having an interior end 36 and an exterior end 38. The output shaft is positioned to be coaxial with the roll axis 14 and is therefore on a common axis with the input shaft 24. (The alternative embodiment of FIG. 13, discussed below, will show that the output shaft need not be coaxial with the roll axis.) The output shaft exterior end 38 extends from the frame output end 22 through a sleeve 40, and is thereby slideably coupled to the frame 12. The output shaft 34 is free for reciprocating linear motion along the roll axis 14 with respect to the frame 12.

The bearing assembly 26 represents thrust bearing means for limiting the longitudinal movement of the offset drive cam flat surface 30 with respect to the frame 12. The bearing assembly 26 comprises an input shaft shoulder 42 supported by an interior bearing 44, an inner bearing spacer 46 of cylindrical shape, an outer bearing spacer of cylindrical shape 48, an exterior bearing 50, and a compression end cap 52. The interior bearing 44 and the exterior bearing 50 are spaced apart by the inner bearing spacer 46 and the outer bearing spacer 48, each having equal lengths. The inner spacer diameter is selected to link the inner races of the interior and exterior bearings 44, and 50, respectively. The outer bearing spacer diameter is selected to link the outer race of the interior and exterior bearings 44, and 50, respectively. The preferred bearings are of a type referred to as radial thrust bearings such a those supplied by the Timkin Company.

The compression end cap 52 is threaded to screw into complementary receiving threads in a frame receiving hole 54. The driving surface of the compression end cap 52 engages the outer race of the exterior bearing 50. The input shaft shoulder 42 engages the inner race of the interior bearing 44. Tightening the compression end cap 52 permits the accurate longitudinal movement of the offset drive cam to the left, as shown in FIG. 2.

Referring to FIG. 1, a rocker housing means is provided in the form of a rocker housing 56. The rocker housing is formed as an assembly of a bearing housing 55 bolted to a housing bracket 57.

The rocker housing 56 has a pitch axis of rotation that is coaxial with the frame pitch axis 16. FIG. 2 more clearly shows a rocker housing yaw axis 58. The rocker housing pitch axis 16 and the yaw axis 58 are mutually orthogonal in a plane containing the rocker housing pitch axis 16 and the rocker housing yaw axis 58. As shown in FIG. 1, the rocker housing pitch and yaw axes pass through the frame common reference point 18.

Figure 4:
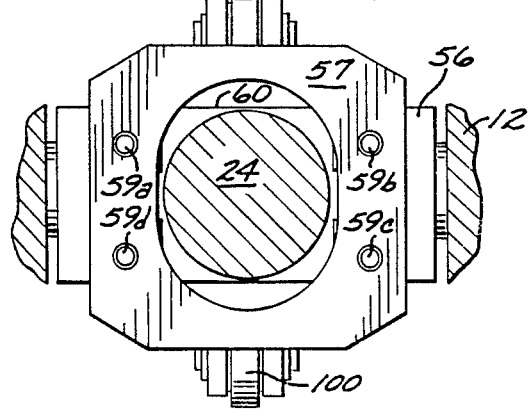
FIG. 4 is a view taken along line 4—4 of FIG. 2, showing the input shaft in section, the view looking through the opening in the rocker housing.

FIG. 4 is a view taken along line 4—4 of FIG. 2, parallel to the yaw axis 58. This view shows the input shaft 24 in section, extending into an opening in the rocker housing assembly 56. Four bolt holes having four bolts 59a, 59b, 59c and 59d therein are shown on the rear surface of housing bracket 57.

Figure 5:
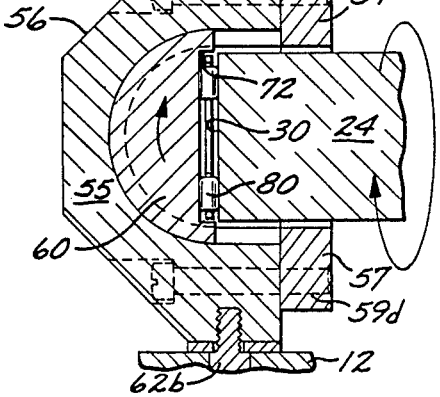
FIG. 5 is a view taken along line 5—5 of FIG. 2, showing the rocker cam, rocker housing and input shaft in section.

FIG. 5 is another sectional view of the rocker housing 56 taken along line 5—5 of FIG. 2. Bolts 59c and 59d are shown in phantom holding the bearing housing 55 to the housing bracket 57. This view also shows a rocker cam 60, and the input shaft 24 in section. Flat surface 30 is shown against roller bearing 80, which is riding in cylindrical recess 72.

Referring again to FIG. 1, a pair of shoulder screws 62a and 62b extend through opposing sides of the frame 12 into the sides of the rocker housing 56 to form pitch bearing means for rotation of the rocker housing pitch axis on the frame pitch axis 16. The shoulder screws 62a and 62b are seated to enable the rocker housing 56 to rotate freely with an oscillatory pitch motion on the frame pitch axis 16. The shoulder screws 62a, 62b are also designed to position the rocker housing common reference point 18 to be coincident with the frame common point 18, which is the point of interception of the frame pitch axis 16 and the frame roll axis 14.

Figure 12:
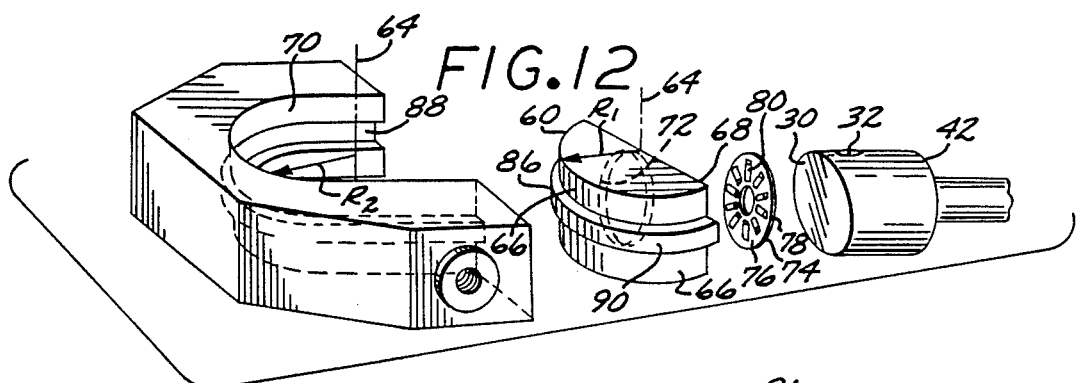
FIG. 12 is an exploded perspective view depicting, from left to right, the rocker housing, the rocker cam, the roller thrust and the offset drive cam.

FIG. 12 shows the rocker housing 56, the rocker cam 60 and the offset drive cam flat surface 30 in an exploded perspective view. The rocker cam 60 is formed to have the shape of a convex semicylinder of constant radius on an axis of rotation 64. The rocker cam 60 has a convex semicylindrical surface 66 of constant radius R1 from the axis of rotation 64 and a flat surface 68 at the rear of the rocker cam 60 containing the axis of rotation 64. The rocker housing 56 has a concave semicylindrical surface 70 at a constant radius R2 from the rocker housing yaw axis 58. The radius R2 is substantially equal to the constant radius R1 of the rocker cam convex semicylindrical surface 66. The concave semicylindrical surface 70 rotatably receives the complementary rocker cam convex semicylindrical surface 66. The flat rocker cam surface 68 has a cylindrical recess 72, shown in phantom. A roller thrust bearing assembly 74, having parallel inner and outer surfaces 76, 78 respectively, is preferably placed within the cylindrical recess 72.

Figure 3:
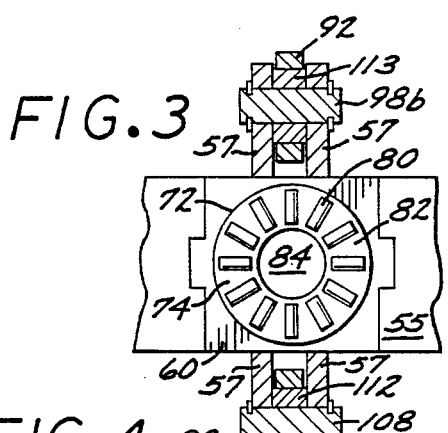
FIG. 3 is a sectional view of FIG. 2 along line 3—3 showing a roller thrust bearing assembly inserted into a recess in the rocker cam.

FIG. 3 shows the roller thrust bearing assembly 74 as seen through a section taken on line 3—3 in FIG. 2. The roller thrust bearing assembly 74 has a plurality of roller bearings 80 extending radially in an evenly spaced array within an annular race assembly 82 having a central opening 84. The roller thrust bearing parallel inner surface 76 faces the base of cylindrical recess 72 and the parallel outer surface faces flat surface 30. The roller thrust bearing assembly outer surface contains the yaw axis 58. The rocker cam 60 is shown in bearing housing 55. The section on line 3—3 also cuts through an upper and lower portion of the housing bracket 57 forming an upper and lower yoke.

After positioning the rocker cam convex semicylindrical surface 66 into the concave semicylindrical surface 70, the rocker cam 60 is free to rotate within predetermined limits on the rocker cam axis of rotation 64. The rocker cam 60 and the rocker housing 56 are formed to position the rocker cam axis of rotation 64 to be coaxially aligned with the rocker housing yaw axis 58 when assembled.

Referring again to FIGS. 1 and 2, the rotary-to-linear motion converter 10 is assembled by inserting the input shaft 24 into the bearing assembly 26 and then assembling the rocker housing 56 into the frame 12 and adjusting the shoulder screws 62a, 62b to position the rocker housing common reference point to be coincident with the frame common point 18. As in FIG. 12, the parallel inner surface 76 of the roller thrust bearing assembly 74 is inserted in cylindrical recess 72. The compression end cap 52 is screwed into the receiving hole 54 and adjusted to position the flat surface 30 to be flush against the roller thrust bearing assembly parallel outer surface 78.

In operation, a clearance of approximately one mil (0.025 mm) is preferred between the flat surface 30 and the parallel outer surface 78 and this clearance is obtained empirically by adjusting the compression end cap 52 to remove all clearance, and then backing the end cap out with a partial turn.

Referring again to FIG. 12, a semicircular belt 86 on the semicircular surface 66 of the rocker cam 60 is inserted into a complementary semicircular receiving groove 88 in the rocker housing 56, and represents means for limiting the longitudinal motion of the rocker cam 60 along the rocker housing yaw axis 58.

The semicircular belt 86 has an outer surface 90 with a circular radius that slightly exceeds the radius of the complementary semicircular receiving groove 88 to minimize friction. With the radius of the semicircular belt 86 slightly exceeding the radius of the complementary semicircular receiving groove 88, the semicircular belt outer surface 90 operates as a bearing surface against the inner surface of the complementary semicircular receiving groove 88.

The convex semicircular surface 66 axially stabilizes the rocker cam 60 against the concave semicylindrical surface 70. In the preferred embodiment, the gap between these surfaces is tightly controlled to be minimal.

Referring again FIG. 2, an upper pivot arm 92 has a forward end 94 and a rear end 96. The forward end 94 is pivotally coupled to the output shaft interior end 36, shown in partial section, by means of a front pin bearing 98a. The rocker housing 56 is further configured to couple its oscillating pitch motion, in the plane of the yaw axis 58 and the roll axis 14, to the pivot arm rear end 96, via a rear pin bearing 98b, in response to the rotation of the offset drive cam flat surface 30 against the rocker cam flat surface 68. The pin bearings 98a, 98b are advantageously conventional roller ball bearings.

A lower pivot arm 100, carrying a pivot arm balance sleeve 102, operates as a counterbalance for the upper pivot arm 92 at high speed. An idler bearing 104 slides on the output shaft 34, without driving it. The idler bearing 104 is coupled to the forward end of the lower pivot arm 100 by an idler pivot pin 106. The idler bearing is preferably of a low-friction material, such as a PTFE.

Figure 6:
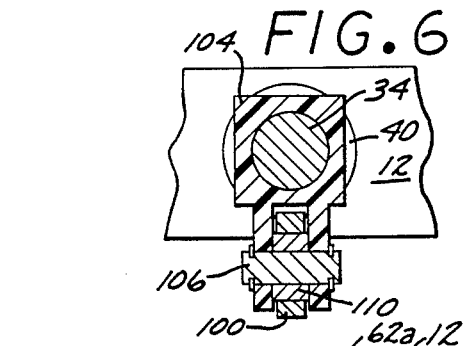
FIG. 6 is a sectional view taken along line 6—6 of FIG. 2, showing the output shaft, the idler bearing, the idler pivot pin, and the balance arm forward pivot pin.

FIG. 6 is a sectional view, taken along line 6—6 of FIG. 2, showing the output shaft 34, the idler bearing 104, and the idler pivot pin 106. The flange of the sleeve bearing 40 is visible against the frame 12. The sectioned area between the idler pivot pin 106 and the lower pivot arm 100 represents a forward roller ball bearing 110. The forward roller ball bearing 110 reduces the frictional load between the members.

FIG. 3 shows a rearward roller ball bearing 112 in section between the the lower pivot arm 100 and a lower pivot arm rear pin bearing 108 that pivotally couples the lower pivot arm 100 to the rocker housing 56. The rearward roller bearing 112 reduces the frictional load between the members. The pivot pin bearings 98b and 108 are shown passing through the sectioned upper and lower yokes of the housing bracket 57. A similar roller bearing 113 is shown between the upper pivot arm 92 and the rear pin bearing 98b. The pivot pin bearing assemblies 98b and 108 represent a means for coupling pitch motion from the rocker housing to the respective upper and lower pivot arms 92 and 100.

Figure 7:
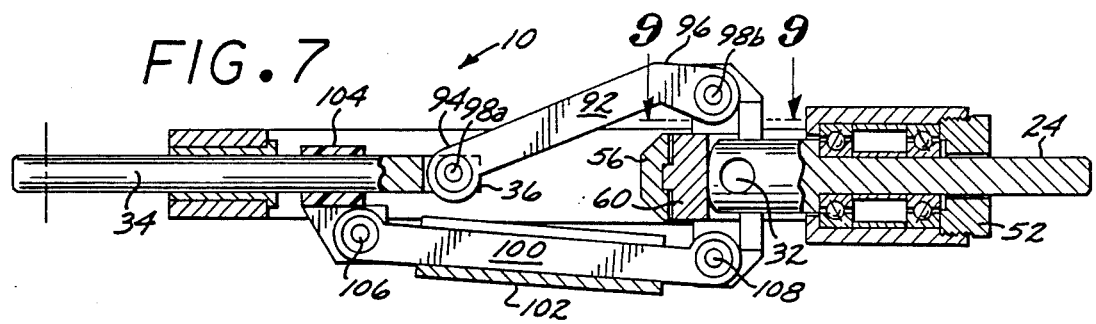
FIG. 7 is a side view of the rotary-to-linear motion converter showing the input shaft rotated 90 degrees counterclockwise, the rocker cam in a deflected position in accordance with the sectional view of FIG. 9, and the output shaft a reference position.

FIG. 7 is a side view of the rotary-to-linear motion converter showing a top view of the input shaft 24 rotated 90 degrees counterclockwise. The rocker cam 60 is in a deflected position in accordance with the sectional view of FIG. 9, and the output shaft 34 is shown at a reference position.

Figure 8:
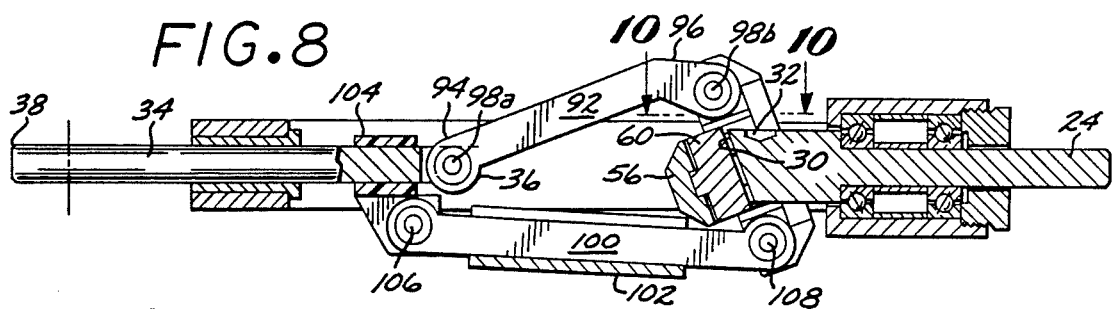
FIG. 8 is a side view of the rotary-to-linear motion converter showing the input shaft at a neutral position, the rocker cam in a deflected position in accordance with the sectional view of FIG. 10, and the output shaft being fully extended.

FIG. 8 is a side view of the rotary-to-linear motion converter 10 showing the input shaft 24 at a neutral position. The rocker cam 60 is shown in a deflected position in accordance with sectional view of FIG. 10. The output shaft 34 is fully extended.

Figure 9:
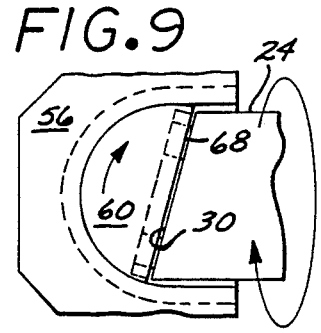
FIG. 9 is a sectional view of FIG. 7 taken along line 9—9, showing the rocker cam deflected clockwise in response to the input shaft being rotated counterclockwise 90 degrees.

FIG. 9 is a sectional view taken along line 9—9 in FIG. 7, showing the rocker cam 60 deflected clockwise in response to the input shaft 24 being rotated counterclockwise 90 degrees as shown in FIG. 7. In this position, the output shaft 34 is centrally positioned between its fully extended position and its fully retracted position.

Figure 10:
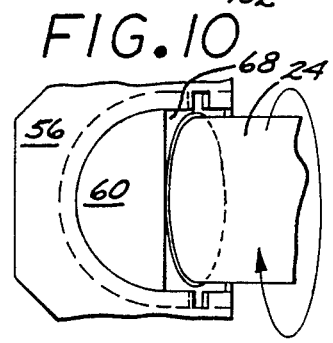
FIG. 10 is a sectional view of FIG. 8 taken along line 10—10 showing the rocker housing and rocker cam rotated counterclockwise on the pitch axis in response to the input shaft at its neutral position.

FIG. 10 is a view of FIG. 8 taken along line 10—10, showing the rocker housing 56 and the rocker cam 60 rotated counterclockwise on the pitch axis 16 in response to the input shaft 24 being positioned in a neutral position as in FIG. 8.

Figure 11:
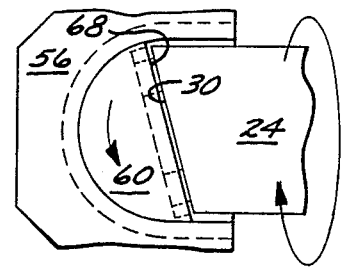
FIG. 11 is a sectional view Of FIG. 8 taken along line 10—10 showing the rocker cam deflected counterclockwise in response the input shaft being rotated clockwise 90 degrees.

FIG. 11 provides a sectional view along line 9—9 of FIG. 7 showing the rocker cam 60 deflected counterclockwise as shown in FIG. 11 if the input shaft 24 of FIG. 7 is rotated clockwise 90 degrees.

Figure 13:
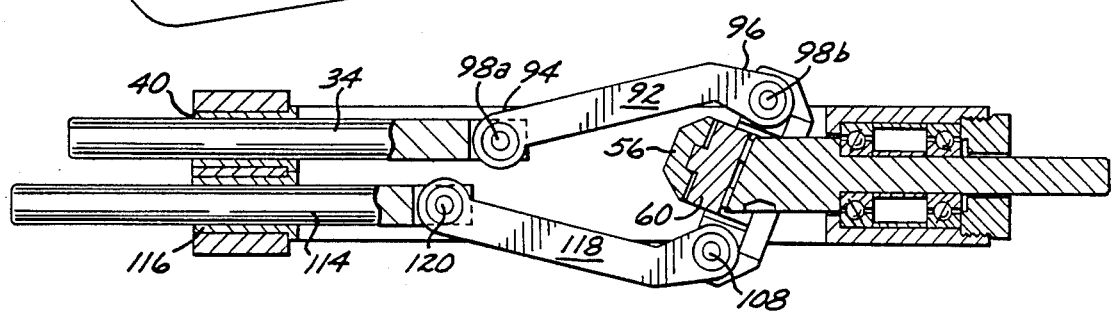
FIG. 13 is a side view in accordance with an alternative embodiment of the present invention, showing the housing and rocker cam rotated clockwise on the pitch axis in response to an input shaft position at 180 degrees, the upper output shaft being retracted and the lower output shaft being extended.

FIG. 13 shows an alternative embodiment of the rotary to linear motion converter 10 that has a second output shaft 114. The first output shaft 34 and the second output shaft 114 are slideably coupled by an upper bushing 40 and a lower bushing 116 respectively to the frame 12. The first and second output shafts 34 and 114 are parallel with the roll axis 14.

A lower pivot arm 118 represents second pivot arm means for transferring oscillatory pitch motion from the rocker housing 56 into reciprocating linear motion. The motions of the first output shaft 34 and the second output shaft 114 are approximately 180 degrees out of phase by operation of the rocker housing on the pitch axis. As the first output shaft 34 extends, the second output shaft 114 is withdrawn.

FIG. 13 shows the upper pivot arm forward end 94 pivotally coupled to the first output shaft interior end by the upper pivot arm forward pin bearing 98a. The upper pivot arm 92 is coupled to the rocker housing 56 by the upper pivot arm rear pin bearing 98b, in a manner equivalent to the single output shaft embodiment of FIG. 8. The rear pin bearing 98b serves as a first crank bearing. The lower pivot arm 118 has a forward end pivotally coupled to the second output shaft interior end at a lower pivot arm forward pin bearing 120, and a rear end pivotally coupled to the rocker housing 56 by the lower pivot arm rear pin bearing 108, which serves as a second crank bearing. The first and second crank bearings are positioned on opposing sides of the rocker housing pitch axis 16 which is normal to the plane of the figure.

While a preferred embodiment of the present invention has been shown and described, it will be apparent to those skilled in the art that various changes and modifications may be made without departing from the invention in its broader aspects.

For example, the roller thrust bearing assembly 74 could be eliminated for applications having reduced performance requirements and a short life expectancy.

In another alternative embodiment, the complementary semicircular receiving groove 88 and the semicircular ring or semicircular belt 86 inserted therein are eliminated and become smooth complementary semicylindrical surfaces. This alternative embodiment (not shown) allows the rocker cam convex semicircular surface 66 to ride directly against the concave semicylindrical surface 70 or to be supported by other semicircular bearing means, such as vertically aligned needle bearings.

With the elimination of the complementary semicircular receiving groove 88 and the semicircular ring or semicircular belt 86 inserted therein, longitudinal motion of the rocker cam along the yaw axis of the rocker housing must be limited by stops or top and bottom caps (not shown) fixed to the rocker housing.

The rocker cam is made of steel in the preferred embodiment but can be made of other materials such as a precision molded ceramic part with an extremely high hardness.

An anti-friction coating (such as PTFE) could be applied to the surfaces of the rocker cam 60, to the concave semicylindrical surface 70 and to the flat surface 30. The rocker cam 60 and the concave semicylindrical surface 70 might be made of self lubricating materials such as impregnated powdered metal castings. In some applications, such as toys, the parts might be made using injection molding to further reduce the cost of fabricating the parts.

It should be appreciated that such modifications and improvements are contemplated by this inventor. The appended claims are intended to cover all such changes and modifications as fall within the true spirit and scope of the present invention.

I claim:

1. A rotary-to-linear motion converter comprising:
   support means determining a roll axis, and a pitch axis passing through a first common point, the axes being mutually orthogonal;
   an input shaft having an interior end, said input shaft rotating on said roll axis and having an offset drive cam formed on a said input shaft interior end, said offset drive cam being positioned at said first common point;
   rocker means operatively supported by said support means and having a rocker means pitch axis and a rocker means yaw axis, said rocker means pitch axis and said rocker means yaw axis being mutually orthogonal and passing through a second common reference point;
   pitch bearing means for pivotally coupling said rocker means to said support means so that said rocker means pitch axis is pivotally rotatable about said support means pitch axis, whereby said second common point is coincident with said first common point;
   rocker cam means for rotating on said rocker means yaw axis and for translating rotary motion from said offset drive cam into oscillatory pitch motion for said rocker means along said rocker means pitch axis;
   output shaft means slidably coupled to said support means; and
   pivot arm means for translating said oscillatory pitch motion of said rocker means into reciprocating linear motion for said output shaft means.

2. The rotary-to-linear motion converter of claim 1, wherein:
   said output shaft means includes a first output shaft positioned to be parallel to said input shaft.

3. The rotary-to-linear motion converter of claim 1, wherein:
   said output shaft means is coaxial with said roll axis.

4. The rotary-to-linear motion converter of claim 1, wherein:
   said offset drive cam has a first flat surface positioned at an offset acute angle with respect to a plane orthogonal to said roll axis, said plane having a central point positioned at said first common point; and
   said rocker cam means has a second flat surface coupled to rotate on said rocker means yaw axis against said first flat surface.

5. The rotary-to-linear motion converter of claim 1, wherein:
   said offset drive cam has a first flat surface positioned at an offset acute angle with respect to a plane orthogonal to said roll axis, said plane having a central point positioned at said first common point;
   said rocker means has a semicircular concave receiving surface with an axis of rotation on said yaw axis; and
   said rocker cam means has a rocker cam with (a) a semicircular convex surface for complementary insertion into said rocker means semicircular concave receiving surface, and (b) a second flat surface positioned to contain and rotate on said rocker means yaw axis against said first flat surface.

6. The rotary-to-linear motion converter of claim 2, further comprising:
   a second output shaft, said first output shaft and said second output shaft being slideably coupled to said support means to be parallel with said roll axis; and
   second pivot arm means for coupling said oscillatory pitch motion of said rocker means into reciprocating linear motion for said second output shaft, the reciprocating motion of said first and second output shafts being opposite in phase.

7. A rotary-to-linear motion converter having an input shaft with an exterior end adapted to be coupled to a source of rotary motion, and an interior end, the motion converter comprising:
   a frame having a roll axis and a frame pitch axis passing through a common point, the axes being mutually orthogonal, said common point being positioned between a frame input end and a frame output end;
   said input shaft being fixed longitudinally and free to rotate on said roll axis;

a first output shaft arranged parallel to said roll axis and coupled to said frame to provide reciprocal linear motion with respect to said frame;

an offset drive cam on said input shaft interior end having a central point on said roll axis;

rocker means having a rocker means pitch axis and a yaw axis, said rocker means pitch axis and said yaw axis being mutually orthogonal and passing through a common reference point, said rocker means having a first crank bearing;

pitch bearing means for rotatably coupling said rocker means pitch axis to be coaxial with and to rotate on said frame pitch axis, said rocker means common reference point being coincident with said frame common point;

rocker cam means for rotating on said yaw axis and for translating rotary motion from said offset drive cam into oscillatory pitch motion for said rocker means;

a pivot arm having a forward end pivotally coupled to said first output shaft interior end and a rear end pivotally coupled to said first crank bearing on said rocker means, for transferring the oscillatory pitch motion of said rocker means into reciprocating linear motion of said first output shaft.

8. The rotary-to-linear motion converter of claim 7, wherein:

said first output shaft is positioned to be coaxial with said roll axis.

9. The rotary-to-linear motion converter of claim 7, further comprising means for limiting longitudinal motion of said rocker cam means along said yaw axis, and wherein:

said offset drive cam has a first flat surface positioned at an offset acute angle with respect to a plane orthogonal to said roll axis, said offset drive cam central point being positioned at said frame common point;

said rocker means has a semicircular concave receiving surface formed to be coaxial with said yaw axis; and said rocker cam means has a rocker cam with (a) a semicircular convex surface for complementary insertion into said rocker means semicircular concave receiving surface, and (b) a second flat surface positioned to contain and rotate on said yaw axis against said first flat surface.

10. The rotary-to-linear motion converter of claim 7, further comprising:

a second output shaft, said first output shaft and said second output shaft being slideably coupled to said frame to be parallel to said roll axis; and second pivot arm means;

wherein said rocker means has a second crank bearing, said first and second crank bearings being positioned on opposing sides of said rocker means pitch axis; and wherein said second pivot arm means has a forward end pivotally coupled to said first output shaft interior end and a rear end pivotally coupled to said second crank bearing, for transferring the oscillatory pitch motion of said rocker means into reciprocating linear motion for said first and second output shafts, the motion of said first output shaft and said second output shaft being 180 degrees out of phase.

11. A rotary-to-linear motion converter having an input shaft with an interior end and an exterior end, said interior end being adapted for coupling to a source of rotary motion, said rotary-to-linear motion converter comprising:

a frame having a roll axis and a pitch axis passing through a common point, said axes being mutually orthogonal, said common point being positioned between a frame input end and a frame output end;

said input shaft being positioned to be coaxial with said roll axis and mounted in said frame to rotate with respect to said frame on said roll axis;

an output shaft mounted in said frame to be parallel with said roll axis and to provide reciprocal linear motion with respect to said frame;

an offset drive cam formed on said input shaft interior end and having a central point on said roll axis;

thrust bearing means for limiting longitudinal movement of said offset drive cam shaft with respect to said frame;

a rocker housing having a rocker housing pitch axis and a yaw axis, said rocker housing pitch axis and yaw axis being mutually orthogonal and passing through a common reference point, said rocker housing having a crank bearing;

a rocker cam coupled to said rocker housing to rotate on said yaw axis and having said yaw axis passing through a rocker cam follower surface;

pitch bearing means for rotatably coupling said rocker housing pitch axis to be coaxial with and to rotate on said frame pitch axis, said rocker housing common reference point being positioned to be coincident with said frame common point;

said offset drive cam being disposed so as to drive said rocker cam follower surface in pitch and yaw rotation on said corresponding rocker housing pitch and yaw axes, thereby to drive said rocker housing into an oscillatory pitch motion; and a pivot arm having a forward end and a rear end, said forward end being pivotally coupled to said output shaft interior end, and said rear end being coupled to said crank bearing for coupling the oscillatory pitch motion of said rocker housing to said pivot arm rear end in response to rotation of said offset drive cam against said rocker cam follower surface, whereby said pivot arm translates said oscillatory motion into the reciprocating linear motion of said output shaft.

12. The rotary-to-linear motion converter of claim 11, further comprising means for limiting longitudinal motion of said rocker cam along said yaw axis, and wherein:

said offset drive cam is further characterized by a first flat surface positioned at an offset acute angle with respect to a plane orthogonal to said roll axis, said first surface having a central point positioned at said frame common point;

said rocker housing further has a semicircular concave receiving surface formed to be coaxial with said yaw axis; and said rocker cam has (a) semicircular convex surface for complementary insertion into said rocker housing semicircular concave receiving surface, and (b) a second flat surface positioned to contain and rotate on said yaw axis against said first flat surface.

13. The rotary-to linear motion converter of claim 12, wherein:

said offset drive cam surface offset acute angle is an angle of no more than about 45 degrees with respect to a plane orthogonal to said roll axis.

14. A rotary-to-linear motion converter having an input shaft adapted to be coupled to a source of rotary motion, comprising:
- a frame having a roll axis and a pitch axis passing through a common point, said axes being mutually orthogonal, said common point being positioned between a frame input end and a frame output end;
- said input shaft being positioned to be coaxial with said roll axis, said input shaft being free to rotate with respect to said frame on said roll axis;
- an output shaft having an interior end and an output end, said output shaft being positioned to be parallel with said roll axis and slideably coupled to said frame for reciprocating linear motion with respect to said frame;
- an offset drive cam having a first flat surface on the interior end of said input shaft, said first flat surface having a central point on said frame roll axis;
- thrust bearing means for limiting longitudinal movement of said input shaft with respect to said frame;
- a rocker housing having a rocker housing pitch axis and a yaw axis, said rocker housing pitch axis and said yaw axis being mutually orthogonal and passing through a common reference point;
- pitch bearing means for aligning said rocker housing pitch axis with said frame pitch axis, said rocker housing being free to rotate with an oscillatory pitch motion on said frame pitch axis, said rocker housing common reference point being coincident with said frame common point;
- a rocker cam having an axis of rotation passing through a second flat surface;
- means for positioning said axis of rotation to be coaxial with said yaw axis and for rotating said second flat surface on said yaw axis, said second flat surface being operatively engaged said first flat surface; and
- a pivot arm having a forward end and a rear end, said forward end being pivotally coupled to said output shaft interior end, said rocker housing being disposed so as to pivotally couple its oscillatory pitch motion to said pivot arm rear end in response to rotation of said first flat surface against said second flat surface, whereby the motion of said pivot arm is translated into reciprocal linear motion of said output shaft.

15. The rotary-to-linear motion converter of claim 14, wherein:
- said first surface forms an angle of no more than about 45 degrees with respect to a plane orthogonal to said roll axis.

16. A rotary-to-linear motion converter for connection to a source of rotary motion, comprising:
- a frame having a roll axis and a pitch axis passing through a common point, said axes being mutually orthogonal, said common point being positioned between a frame input end and a frame output end;
- an input shaft having an interior end and an external end, said input shaft being positioned to be coaxial with said roll axis, said input shaft external end extending from said frame input end and being adapted to receive rotational motion referenced to said frame from a source of rotary motion, said input shaft being mounted to rotate freely with respect to said frame on said roll axis;
- an offset drive cam formed on the interior end of said input shaft, said offset drive cam having a flat surface forming an offset acute angle with respect to a plane normal to the roll axis and having a central point on said roll axis;
- an output shaft having an interior end and an external end, said output shaft being positioned to be coaxial with said roll axis, said output shaft external end extending from said frame output end, said output shaft being slideably coupled to said frame for reciprocating linear motion with respect to said frame;
- thrust bearing means for limiting longitudinal movement of said input shaft with respect to said frame;
- a rocker housing assembly having a rocker housing pitch axis and a yaw axis, said pitch axis and yaw axis being mutually orthogonal and passing through a common reference point, said rocker housing further having a concave semicylindrical surface at a first constant radius from said yaw axis;
- a pitch bearing for coaxially aligning said rocker housing pitch axis with said frame pitch axis and for rotatably coupling said rocker housing assembly to be free to rotate with an oscillatory pitch motion on said pitch bearing along said frame pitch axis, said pitch bearing positioning said rocker housing assembly common reference point to be coincident with said frame common point;
- a rocker cam formed to have a convex semicylindrical surface of a second constant radius from an axis of rotation and a flat surface containing said axis of rotation, said second constant radius being substantially equal to said first constant radius of said rocker housing concave semicylindrical surface for complementary insertion therein, said rocker cam axis of rotation being coaxial with said yaw axis, said rocker cam being free to rotate on said yaw axis within predetermined limits, with said rocker cam flat surface being operatively engaged with said offset drive cam flat surface;
- means for limiting longitudinal motion of said rocker cam along said yaw axis; and
- a pivot arm having a forward end and a rear end, said forward end being pivotally coupled to said output shaft interior end, said rocker housing assembly being disposed so as to pivotally couple its oscillatory pitch motion to said pivot arm rear end in response to rotation of said offset drive cam flat surface against said rocker cam flat surface, whereby the motion of said pivot arm is translated into reciprocating linear motion of said output shaft.

17. The rotary-to-linear motion converter of claim 16 wherein:
- said offset drive cam surface offset acute angle is an angle of no more than about 45 degrees with respect to a plane orthogonal to said roll axis.

18. The rotary-to-linear motion converter of claim 16, wherein said rocker cam surface has a cylindrical recess; and wherein said motion converter further comprises:
- a surface roller thrust bearing assembly having parallel inner and outer surfaces;
- said roller thrust bearing assembly inner surface being disposed within said cylindrical recess, said roller thrust bearing outer surface containing said yaw axis and being disposed against the flat surface of said offset drive cam.

* * * * *